United States Patent [19]

Sherman

[11] 3,995,866
[45] Dec. 7, 1976

[54] RECORD PLAYER MAT

[76] Inventor: Harris Leslie Sherman, 18591 Hillhaven Drive, Santa Ana, Calif. 92705

[22] Filed: Nov. 25, 1975

[21] Appl. No.: 635,202

[52] U.S. Cl. .............................. 274/1 R; 274/39 R
[51] Int. Cl.² ......................................... G11B 3/60
[58] Field of Search .................... 274/39 R, 42, 1 R

[56] References Cited
UNITED STATES PATENTS

| | | | |
|---|---|---|---|
| 3,034,795 | 5/1962 | Guest | 274/39 |
| 3,071,381 | 1/1963 | Schneider | 274/39 R |
| 3,540,736 | 11/1970 | Pallie | 274/1 R |

FOREIGN PATENTS OR APPLICATIONS 111,560   8/1944   Sweden ............................ 274/39 R Primary Examiner—Harry N. Haroian
Attorney, Agent, or Firm—Knobbe, Martens, Olson, Hubbard & Bear

[57] ABSTRACT

A record turntable mat is provided with a groove made of record-like material. The groove is located so that if the record player is operated automatically when there is no record on the turntable the record stylus will engage the groove and thus not be damaged. Other portions on the upper surface of the mat are made of rubber-like material to support and drivingly engage a record when the turntable is rotated.

6 Claims, 4 Drawing Figures

RECORD PLAYER MAT

This invention relates to an improved mat or platter for the upper surface of a turntable. Frequently a record player tone arm will be moved into record playing position when there is no record on the turntable. When this occurs, the stylus on the record player tone arm will engage the mat typically positioned on the upper surface of the turntable to engage a record. Such mat is usually made of a soft rubber-like material which will not damage the record and yet will frictionally transmit the rotational forces of the turntable to the record without slippage. Slippage will of course distort the sound from the record and could possibly damage the record or the stylus.

If the stylus should engage the turntable mat, the stylus is very likely to become damaged. This is a serious problem for the more expensive styluses which are typically more easily breakable and are on more delicately balanced tone arms than some of the less expensive styluses.

In accordance with the present invention, there is provided an improved record mat which will avoid or minimize the possibility of damage to a record stylus or its tone arm if the stylus is allowed to be placed into operation without a record being on the turntable. Groove means are provided on the upper surface of the mat in a location such that the stylus is likely to engage the groove means if the record player is inadvertently operated without a record on the turntable. The groove means is made of plastic material such as that used for making records which will not damage the stylus. Also the groove means will typically terminate in a circular portion which will cause the stylus to travel in a safe, circular path until the record player is shut off.

The improved mat of the invention can be constructed in various forms. In a preferred arrangement, the mat is made of a resilient rubber-like material having ribs on its upper surface for engaging and supporting a record, in much the same manner as a conventional mat. The circular groove means made of plastic record-like material are formed as inserts in the upper surface of the mat at the desired locations.

In another approach, the mat is primarily made of record-like material and then provided with portions on its upper surface made of material suitable for supporting a record and driving a record. Such material may be in the form of an extra layer attached to the mat or an insert to the mat, or may be sprayed onto the mat in the desired location.

As another variation of the invention, the grooves formed in the mat may have a spiral path terminating in a circle near the center of the mat with the portions of the mat to support a record being located between the spiral turns of the spiral groove means.

In yet another variation of the invention the groove means may be provided with a recorded message so that when the stylus engages the groove means an audible warning is given advising the listener that there is no record on the turntable.

For a more thorough understanding of the invention refer now to the following detailed description and drawings in which.

Figure 1:
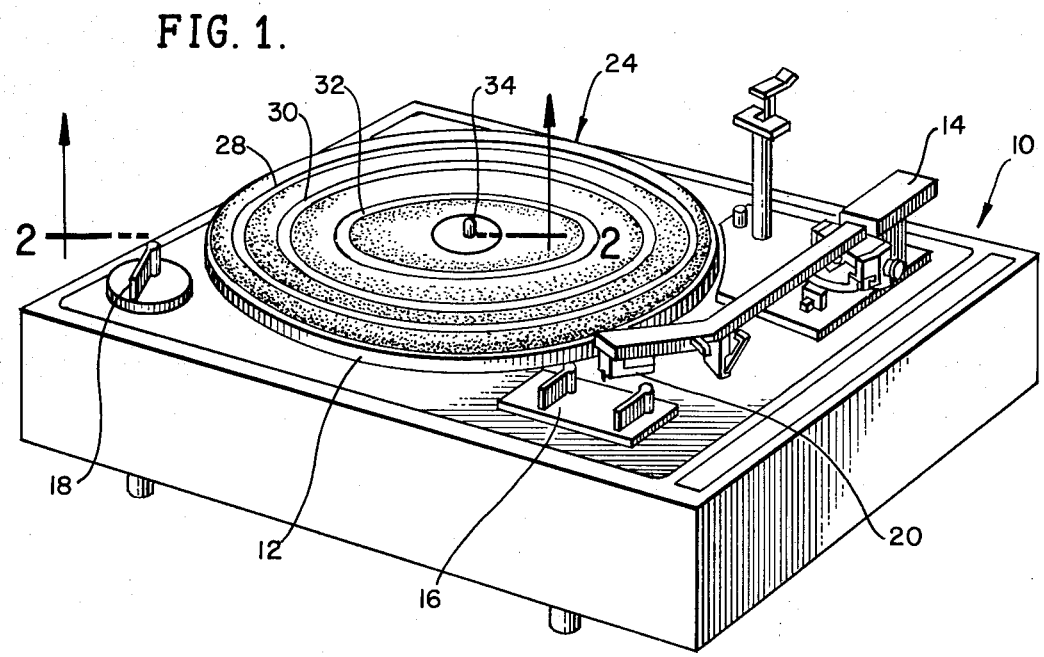
FIG. 1 is a perspective view of a record player illustrating the improved turntable mat of the invention.
Figure 2:
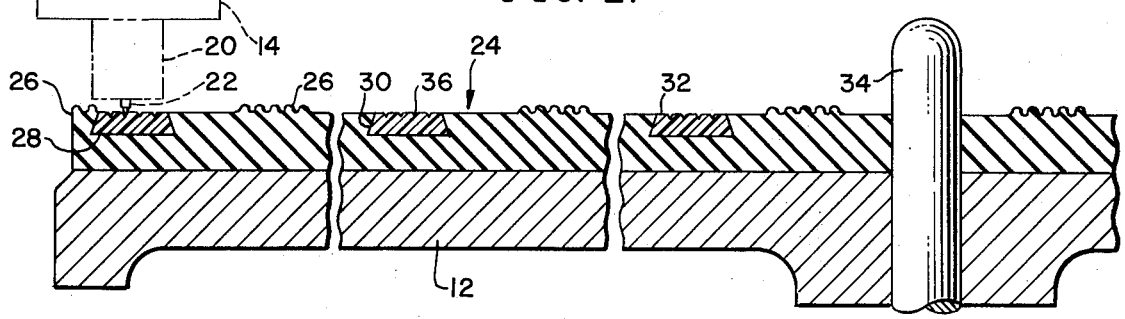
FIG. 2 is a cross-sectional schematic view of a turntable on line 2—2 of FIG. 1.

Referring now to FIGS. 1 and 2, there is shown a conventional record player 10 having a disc shaped turntable 12, and a tone arm 14. The record player is provided with conventional means for rotating the turntable at the desired speeds as selected by a suitable manual control 16. The record player is also provided with conventional means for handling records of different diameters, such as the conventional 12 inch, 10 inch and 7 inch sizes, as selected by suitable controls 18. The tone arm 14 supports on its outer end a conventional transducer or pickup cartridge 20 including a stylus 22 which rides within a record groove.

Positioned on the upper surface of the turntable 12 is a preferred embodiment of the improved record player mat 24 of the invention. The mat 24 is a thin, flat disc made of soft rubber or plastic-like material such as that used for conventional mats. A plurality of spaced, upwardly extending, circular, concentric ribs 26 are formed on the upper surface of the mat 24 to engage, support and frictionally drive a record. The mat may be formed integrally with the turntable; may be formed separately and then attached to the turntable or may be separately formed and simply positioned on the turntable.

Formed as inserts in the upper surface of the mat 24 are concentric rings 28, 30 and 32 having roughly 12 inch, 10 inch and 7 inch diameters respectively around a central spindle 34. The inserts can be at different locations but they are selected as shown because those are the standard positions that tone arms are usually automatically moved to accommodate records of such sizes. The inserts are made of a material such as the hard plastic used for making records so that the stylus 22 and the tone arm 14 will not be damaged if the stylus should engage the inserts.

Formed in the upper surface of each insert 28, 30 and 32 is groove means 36 made in the form of a single spiral groove havin four convolutions as illustrated in FIG. 2, or formed as a series of circular grooves. These grooves are comparable to those found in records so that the stylus 22 and the tone arm 14 will not be damaged if the stylus should engage such grooves.

From the foregoing, the operation of the invention is readily apparent. If the record player should be operated when there is no record on the mat 24, the stylus 22 will hopefully engage one of the inserts 22, 30 or 32. If it does, the stylus will simply engage one of the grooves 36 which will receive the stylus in the same manner that it is received when engaging a record. Most likely any such inadvertent operation would occur when the record player is operated in a manner such that the tone arm 14 is automatically moved into playing position. This would most likely occur at the 7 inch, 10 inch or 12 inch diameter locations. When the stylus engages one of the grooves in the insert, it will simply move as it does on a record until it reaches a circular groove and then will be confined in that groove until the record player is stopped. Actually only a single circular groove is needed on each insert if the movement of the tone arm is quite precise. However, since there may be some variance in this area several grooves are provided for each insert.

The inserts 28, 30 and 32 can be attached to the mat 24 in a variety of ways. In the arrangement illustrated in FIG. 2, the inserts are formed with a slightly trapezoidal cross-section which will retain the inserts in the mating recesses in the mat. The flexibility of the mat material enables inserts of such shape to be snapped into position. The inserts could, of course, be glued to the mat or attached through mechanical means.

Figure 3:
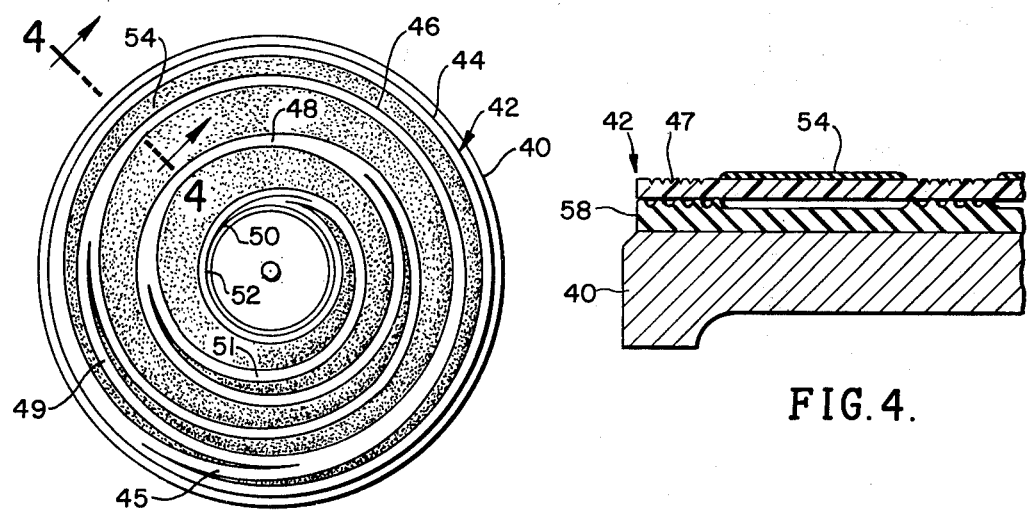
FIG. 3 is a schematic plan view illustrating alternate embodiments of the record player mat of the invention.
Figure 4:
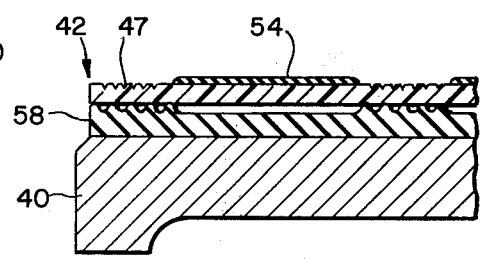

FIGS. 3 and 4 illustrate several alternative aspects or additional features of the invention. A turntable 40 is shown with a mat or platter 42 having an outer grooved band 44 on its upper surface. This band has several convolutions of a continuous spiral groove 47 which extends through a connecting section 45 to a middle grooved band 46 at approximately the 10 inch in diameter location. The spiral groove 47 continues and joins an inner band 48 at approximately the 7 inch diameter location through connecting section 49. This spiral joins an inner central circular band 50 through connecting section 51, and terminates in a circular groove portion 52. Consequently, if the stylus strikes any of the grooved surfaces on the mat 42, it will continue moving inwardly until it reaches the inner circular groove 52 in the band 50. If the record player has an automatic shut off mechanism, the tone arm should then return to the "off" position. If the record player does not have an automatic return or the automatic return is not functioning, the stylus will simply continue to ride in the circular groove until the stylus is manually removed.

The groove bands 44, 46, 48 and 50 are separated by section 54 made of rubber-like material which extend above the grooved bands to engage a record which may be placed on the mat. In the arrangement illustrated in FIGS. 3 and 4, the mat is actually made of plastic-like record material and the rubber-like material 54 is shown as a separate layer which is attached by suitable means to the upper surface of the hard plastic portion 55 of the mat 42. The rubber-like layer 54 could, of course, be sprayed on or otherwise applied to the hard plastic portion 55. Having the mat or platter primarily made of a rigid plastic portion also enables the device to be used on a turntable that is smaller than 12 inches in diameter but can accommodate 12 inch records. In other words, the mat or platter would extend beyond the edge of the turntable.

It should also be recognized that the spiral groove approach illustrated in FIG. 3 may also be applied in manufacturing the construction of FIG. 2. That is, the inserts 28, 30 and 32 for the arrangement of FIGS. 1 and 2 may be formed in a continuous spiral. Moreover, the construction of FIG. 2 may be made like that of FIGS. 3 and 4. That is, the basic mat 24 may be made of rigid record-like plastic with the concentric grooved bands being formed in the rigid material, and the raised soft rubber-like portions between the grooves may be separate bands applied to the hard plastic platter.

Making the platter or mat of hard plastic like a record is most practical in those situations where the rubber-like mat usually provided on a record turntable is somewhat permanently attached to the turntable disc. This arrangement is illustrated in FIG. 4 wherein the mat or platter 42 is shown resting on the raised ribs of a conventional mat 58 attached to the turntable 40. Slippage is prevented in this arrangement because the platter 40 engages the soft rubber-like mat 58 and a record placed on the platter 42 in turn engages a rubber-like surface 54 on the upper side of the mat. If a platter is to be made of rigid material and not used in conjunction with a conventional turntable mat, means should be provided either on the platter or on the turntable to make certain that the platter does not slip with respect to the turntable.

As another feature of the invention, an audible warning can be provided to indicate that there is no record on the turntable. Conveniently this can be a recorded message in the grooves 36 or 47 of the mats 24 and 42.

What is claimed is:

1. A mat for use on a turntable of a record player which is adapted to play several sizes of records, said mat comprising:

a record supporting surface having record engaging means for frictionally engaging a record to drive same upon rotation of the turntable so that the record can be played; and a plurality of stylus protecting means mounted in recesses defined in said record supporting surface, each stylus protecting means being formed of plastic recordlike material which will not damage a record playing stylus upon contact therewith, said stylus protecting means being in the form of separate radially spaced apart concentric rings each inserted into one of said recesses defined in said record supporting surface and each having a plurality of separate substantially circular stylus receiving grooves defined therein, each of said stylus protecting means inserts being located at an initial playing position for each of the several sizes of records played by the record player and to which the stylus will be moved by the record player during automatic operation thereof so that the record playing stylus will engage one of said stylus receiving grooves and be guided in a single substantially circular path until the record player is shut off should the record player be operated in a manner such that the stylus engages the mat during rotation of the turntable.

2. The mat of claim 1 wherein said record supporting means on the mat which supports and drives a record extends above said stylus protecting means.

3. The mat of claim 1 wherein said stylus protecting means is made of material different from the main body of said mat.

4. The mat of claim 3 wherein the mat is made of resilient rubber-like material.

5. The mat of claim 1 wherein the mat is made primarily of rigid material of the type used for making phonograph records and said record supporting means is a resilient material applied to upper portions of the mat.

6. The mat of claim 1 wherein each of said stylus receiving grooves is formed to have a message recorded therein which warns the listener that the stylus is not engaged on a record.

* * * * *